(12) United States Patent
Béguin et al.

(10) Patent No.: US 11,015,645 B2
(45) Date of Patent: May 25, 2021

(54) BEARING, UNIT FOR CONVERTING A FLAT SUBSTRATE, AND METHODS FOR MOUNTING AND REMOVING A ROTARY TOOL

(71) Applicant: BOBST MEX SA, Mex (CH)

(72) Inventors: Boris Béguin, Féchy (CH); Philippe Clément, Penthalaz (CH); Mathieu Gavin, Puidoux (CH)

(73) Assignee: BOBST MEX SA

(*) Notice: Subject to any disclaimer, the term of this patent is extended or adjusted under 35 U.S.C. 154(b) by 384 days.

(21) Appl. No.: 15/532,134

(22) PCT Filed: Dec. 3, 2015

(86) PCT No.: PCT/EP2015/025093
§ 371 (c)(1),
(2) Date: Jun. 1, 2017

(87) PCT Pub. No.: WO2016/087052
PCT Pub. Date: Jun. 9, 2016

(65) Prior Publication Data
US 2017/0268566 A1 Sep. 21, 2017

(30) Foreign Application Priority Data

Dec. 4, 2014 (EP) .................................... 14020101

(51) Int. Cl.
*F16C 13/02* (2006.01)
*F16C 25/08* (2006.01)
(Continued)

(52) U.S. Cl.
CPC ................ *F16C 13/06* (2013.01); *B31F 1/07* (2013.01); *B31F 1/10* (2013.01); *F16C 13/026* (2013.01);
(Continued)

(58) Field of Classification Search
CPC ........ F16C 23/10; F16C 13/02; F16C 13/024; F16C 13/026; F16C 25/06; F16C 25/08;
(Continued)

(56) References Cited

U.S. PATENT DOCUMENTS 3,347,157 A 10/1967 Kemp ............................ 100/41
3,527,159 A * 9/1970 Edwards ................ D06C 15/02
100/170
(Continued)

FOREIGN PATENT DOCUMENTS

CN 1767901 5/2006
DE 2 214 314 A1 10/1973
(Continued)

OTHER PUBLICATIONS

Machine Translation of DE 2750530 (Year: 1977).*
(Continued)

*Primary Examiner* — Alan B Waits
(74) *Attorney, Agent, or Firm* — Ostrolenk Faber LLP

(57) ABSTRACT

A bearing for holding a rotary conversion tool (10, 11) that includes two end rolling bearing devices (26, 28), at least one intermediate rolling bearing device (27) interposed between the end rolling bearing devices (26, 28), the end and intermediate rolling bearing devices (26, 27, 28) being intended to engage with an end (10a, 10b, 11a, 11b) of the rotary tool (10, 11), and at least one mechanical actuator (32, 33) configured to exert a radial preload force (Fo, Fo') at the intermediate rolling bearing device (27).

11 Claims, 8 Drawing Sheets

(51) Int. Cl.
  *F16C 13/06* (2006.01)
  *B31F 1/07* (2006.01)
  *B31F 1/10* (2006.01)
  *F16C 25/06* (2006.01)

(52) U.S. Cl.
  CPC ...... *F16C 25/08* (2013.01); *B31F 2201/0753* (2013.01); *F16C 25/06* (2013.01); *F16C 2324/16* (2013.01)

(58) Field of Classification Search
  CPC ...... F16C 19/54; F16C 19/46; F16C 2324/16; F16C 13/06; B21B 31/20; B21B 31/203; B21B 31/32; B21B 31/07; B31F 1/07; B31F 1/10; B31F 2201/0753
  See application file for complete search history.

(56) References Cited

U.S. PATENT DOCUMENTS

| | | | | |
|---|---|---|---|---|
| 3,731,620 | A * | 5/1973 | Klemmer | B30B 3/04 101/23 |
| 4,226,150 | A | 10/1980 | Reed | 83/346 |
| 4,299,162 | A * | 11/1981 | Hartmann | D06C 15/08 100/162 B |
| 4,620,477 | A * | 11/1986 | Ripani | A23G 1/04 100/168 |
| 4,699,050 | A | 10/1987 | Heise | 100/168 |
| 7,300,396 | B2 | 11/2007 | Pitkämäki et al. | 494/15 |
| 2005/0254737 | A1 * | 11/2005 | Scheffe | B21B 29/00 384/126 |
| 2008/0187265 | A1 * | 8/2008 | Koda | F16C 19/525 384/563 |

FOREIGN PATENT DOCUMENTS

| | | |
|---|---|---|
| DE | 27 50 530 A1 | 5/1979 |
| GB | 174942 | 3/1923 |
| JP | 61-211514 | 9/1986 |

OTHER PUBLICATIONS

International Search Report dated Apr. 11, 2016 in corresponding PCT International Application No. PCT/EP2015/025093.
Written Opinion dated Apr. 11, 2016 in corresponding PCT International Application No. PCT/EP2015/025093.
Office Action dated Jun. 5, 2019 in corresponding Japanese Patent Application No. 2017-529042 (English Translation Only).
Office Action dated Jul. 23, 2018 in corresponding Japanese Patent Application No. 2017-529042 (English Translation Only).
Indian Examination Report dated Dec. 9, 2019 issued in corresponding Indian Patent Application No. 201747021320 (with English Translation).

* cited by examiner

BEARING, UNIT FOR CONVERTING A FLAT SUBSTRATE, AND METHODS FOR MOUNTING AND REMOVING A ROTARY TOOL

CROSS-REFERENCE TO RELATED APPLICATION

The present application is a 35 U.S.C. §§ 371 national phase conversion of PCT/EP2015/025093, filed Dec. 3, 2015, which claims priority of European Patent Application No. 14020101.3, filed Dec. 4, 2014, the contents of all of which are incorporated herein by reference. The PCT International Application was published in the French language.

FIELD OF THE INVENTION

The present invention relates to a bearing for holding a rotary conversion tool. The invention relates to a unit for converting a flat substrate, comprising at least one bearing. The invention also relates to a method for mounting at least one rotary conversion tool in, and removing it from, a holding bearing.

BACKGROUND

A machine for converting a substrate is intended for the production of packaging. In this machine, an initial flat substrate, such as a continuous web of cardboard, is unrolled and printed on by a printing station comprising one or more printer units. The flat substrate is then transferred into an introduction unit and then into an embossing unit, possibly followed by a scoring unit. The flat substrate is then cut in a cutting unit. After ejection of the scrap areas, the preforms obtained are sectioned in order to obtain individual boxes.

The rotary conversion unit may be an embossing unit, a scoring unit, a cutting unit, a scrap-ejection unit, or a printer unit. Each conversion unit comprises a cylindrical upper conversion tool and a cylindrical lower conversion tool, between which the flat substrate passes in order to be converted. In operation, the rotary conversion tools rotate at the same speed but in opposite directions to one another. The flat substrate passes through the gap situated between the rotary tools, which form a relief by embossing, form a relief by scoring, cut the flat substrate into preforms by rotary cutting, eject scrap, or print a pattern during printing.

The ends of the rotary tools are driven in rotation by motorized systems and supported by bearings provided with rolling bearings. It can prove tricky to adjust the functional clearances between the bearings and the ends of the rotary tools because, when the clearances are too small, the operations for mounting and removing the rotary tools can risk damaging the rotary tools. By contrast, when the ends are not clamped sufficiently, the rotary tools can shift, although they need to be held firmly parallel to one another in order for the conversion operations to run smoothly.

SUMMARY OF THE INVENTION

An aim of the present invention is therefore to propose a bearing, a conversion unit, and methods for mounting and removing a rotary tool which at least partially solve the drawbacks of the prior art.

To this end, a subject of the present invention is a bearing for holding a rotary conversion tool, comprising two end rolling bearing devices, at least one intermediate rolling bearing device interposed between the two end rolling bearing devices, the two end rolling bearing devices and the intermediate rolling bearing device being intended to engage with an end of the rotary conversion tool, and at least one mechanical actuator configured to exert a radial preload force at the intermediate rolling bearing device.

The radial preload force exerted at the intermediate rolling bearing device opposes the radial reaction forces of the end rolling bearing devices. This tightens the rolling bearing devices on the end of the rotary tool, such that the mounting exhibits zero or virtually zero clearance between the holding bearing and the end of the rotary tool. The taking up of clearances that is thus realized allows the bearings to hold the rotary tools with precise relative positioning and effective holding rigidity.

The mechanical actuator can be configured to exert a radial preload force at an external ring of the intermediate rolling bearing device. More specifically, the mechanical actuator can be configured to move an external ring of the intermediate rolling bearing device radially.

According to one exemplary embodiment, the mechanical actuator comprises a control element configured to activate and deactivate the application of the radial preload force. Thus, the exertion of the radial preload force can be deactivated during maintenance phases to make it easier to remove and mount the rotary tools.

The mechanical actuator may comprise any type of mechanical actuator, such as a spring or a screw mechanical actuator. According to one exemplary embodiment, the mechanical actuator comprises a cylinder, such as a hydraulic, electric or pneumatic cylinder. The cylinder comprises for example a chamber and a piston, a first end of which is able to move in the chamber in a radial direction with respect to an external ring of the intermediate rolling bearing device, and a second end of which is fixed to the intermediate rolling bearing device.

According to one exemplary embodiment, each of the rolling bearing devices has an internal surface and an external ring. At least one internal surface of a rolling bearing device is formed by the external surface of the end of the rotary tool.

A further subject of the invention is a unit for converting a flat substrate, such as a scoring unit, an embossing unit, a rotary cutting unit, a scrap ejection unit, or a printing unit, intended to comprise an upper rotary conversion tool and a lower rotary conversion tool, the upper rotary conversion tool and the lower rotary conversion tool being arranged one above the other, the conversion unit comprising at least one bearing for holding a rotary conversion tool as described and claimed below.

According to one exemplary embodiment, the conversion unit comprises:
  a holding bearing, which is intended to engage with an end of the upper rotary tool and the mechanical actuator of which is configured to move the intermediate rolling bearing device upward, and
  a holding bearing, which is intended to engage with an end of the lower rotary tool and the mechanical actuator of which is configured to move the intermediate rolling bearing device downward.

The vertical clearance between the bearings and the ends of the rotary tools in the direction of the forces exerted on the conversion unit is thus reduced.

A further subject of the invention is a method for mounting a rotary conversion tool in a holding bearing of a rotary conversion tool, which comprises the steps of:
  inserting the ends of the rotary conversion tools into the holding bearings, and then exerting a radial preload force at the intermediate rolling bearing device interposed between the end rolling bearing devices.

A further subject of the invention is a method for removing a rotary conversion tool from a holding bearing of a rotary conversion tool, which comprises the steps of:

deactivating the application of a radial preload force at the intermediate rolling bearing device interposed between the end rolling bearing devices, and extracting the ends of the rotary conversion tools from the holding bearings.

BRIEF DESCRIPTION OF THE DRAWINGS

Further advantages and features will become apparent from reading the description of the invention and from the appended figures, which show a nonlimiting exemplary embodiment of the invention and in which.

Figure 2:
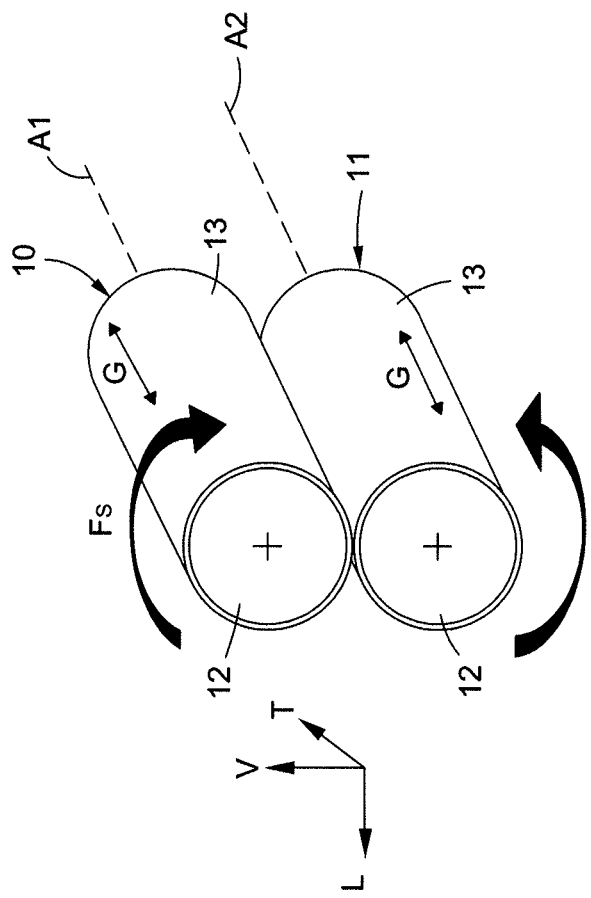
FIG. 2 shows a perspective view of an upper rotary tool and of a lower rotary tool.

The longitudinal, vertical and transverse directions indicated in FIG. 2 are defined by the trihedron L, V, T. The transverse direction T is the direction perpendicular to the longitudinal direction of movement L of the flat substrate. The horizontal plane corresponds to the plane L, T. The front and rear positions are defined with respect to the transverse direction T as being on the side of the driver and on the opposite side from the driver, respectively.

DETAILED DESCRIPTION OF THE PREFERRED EMBODIMENTS

Figure 1:
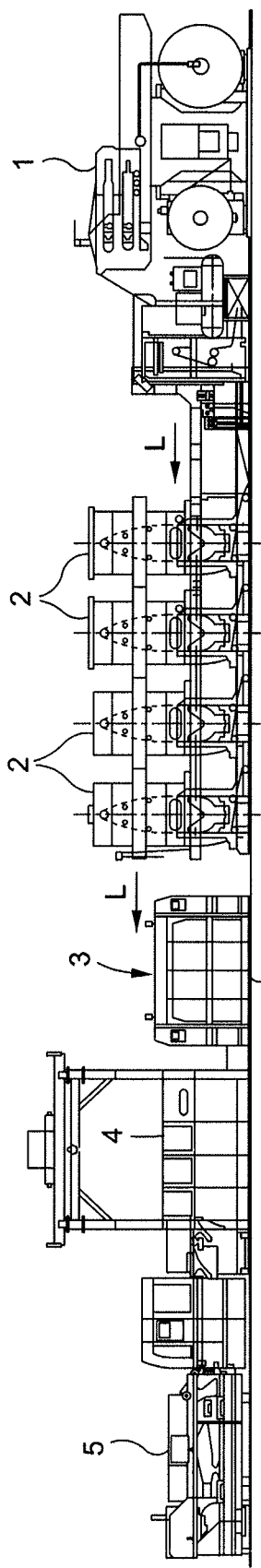
FIG. 1 is an overall view of an example of a conversion line for converting a flat substrate.

A conversion line for converting a flat substrate, such as a flat cardboard or a continuous web of paper wound on a reel, makes it possible to carry out various operations and obtain packaging such as folding boxes. As shown in FIG. 1, the conversion line comprises, disposed one after another in the order of passage of the flat substrate, an unwinding station 1, several printer units 2, one or more embossing units in series followed by one or more scoring units in series 3, followed by a rotary cutting unit 4 or platen die-cutting unit, and a station 5 for receiving the manufactured objects.

The conversion unit 7 comprises an upper rotary tool 10 and a lower rotary tool 11, which modify the flat substrate by printing, embossing, scoring, cutting, ejection of scrap, etc., in order to obtain packaging.

The rotary tools 10 and 11 are mounted parallel to one another in the conversion unit 7, one above the other, and extend in the transverse direction T, which is also the direction of the axes of rotation A1 and A2 of the rotary tools 10 and 11 (see FIG. 2). The rear ends of the rotary tools 10 and 11, on the opposite side from the driver, are driven in rotation by motorized drive means. In operation, the rotary tools 10 and 11 rotate in opposite directions about each of the axes of rotation A1 and A2 (arrows Fs and Fi). The flat substrate passes through the gap situated between the rotary tools 10 and 11 in order to be embossed and/or scored and/or cut and/or printed on therein.

At least one of the rotary tools, the upper rotary tool 10 or the lower rotary tool 11, can comprise a mandrel 12 and a removable sleeve 13 that is able to be fitted on the mandrel 12 in the transverse direction T (FIG. 2, arrow G). Thus, when changing the rotary tools 10 and 11 is desired, all that is necessary is to change the sleeves 13 rather than the entire rotary tool 10 and 11. Since it is easier to handle the sleeve 13 on account of its low weight relative to that of the entire rotary tool 10 and 11, the change of operation can be effected rapidly. Moreover, the sleeves 13 are inexpensive compared with the price of the rotary tool 10 and 11 as a whole. It is thus advantageous to use one and the same mandrel 12 in combination with several sleeves 13 rather than to acquire several entire rotary tools 10 and 11.

The conversion unit 7 comprises at least one bearing 14, 15, 16 and 17 that is intended to engage with an end 10a, 10b, 11a, 11b of a rotary tool 10, 11 in order to hold the rotary tool, allowing the rotary tool to rotate. More specifically, the conversion unit 7 comprises four bearings. A front upper bearing 14 is intended to engage with a front end 10a of the upper rotary tool 10. A front lower bearing 15 is intended to engage with the front end 11a of the lower rotary tool 11. A rear upper bearing 16 is intended to engage with the rear end 10b of the upper rotary tool 10. A rear lower bearing 17 is intended to engage with the rear end 11b of the lower rotary tool 11. The bearings 14, 15, 16, 17 are mounted in pairs, vertically one above the other, in a respective tool-holder column 23 of the conversion unit 7.

Figure 3:
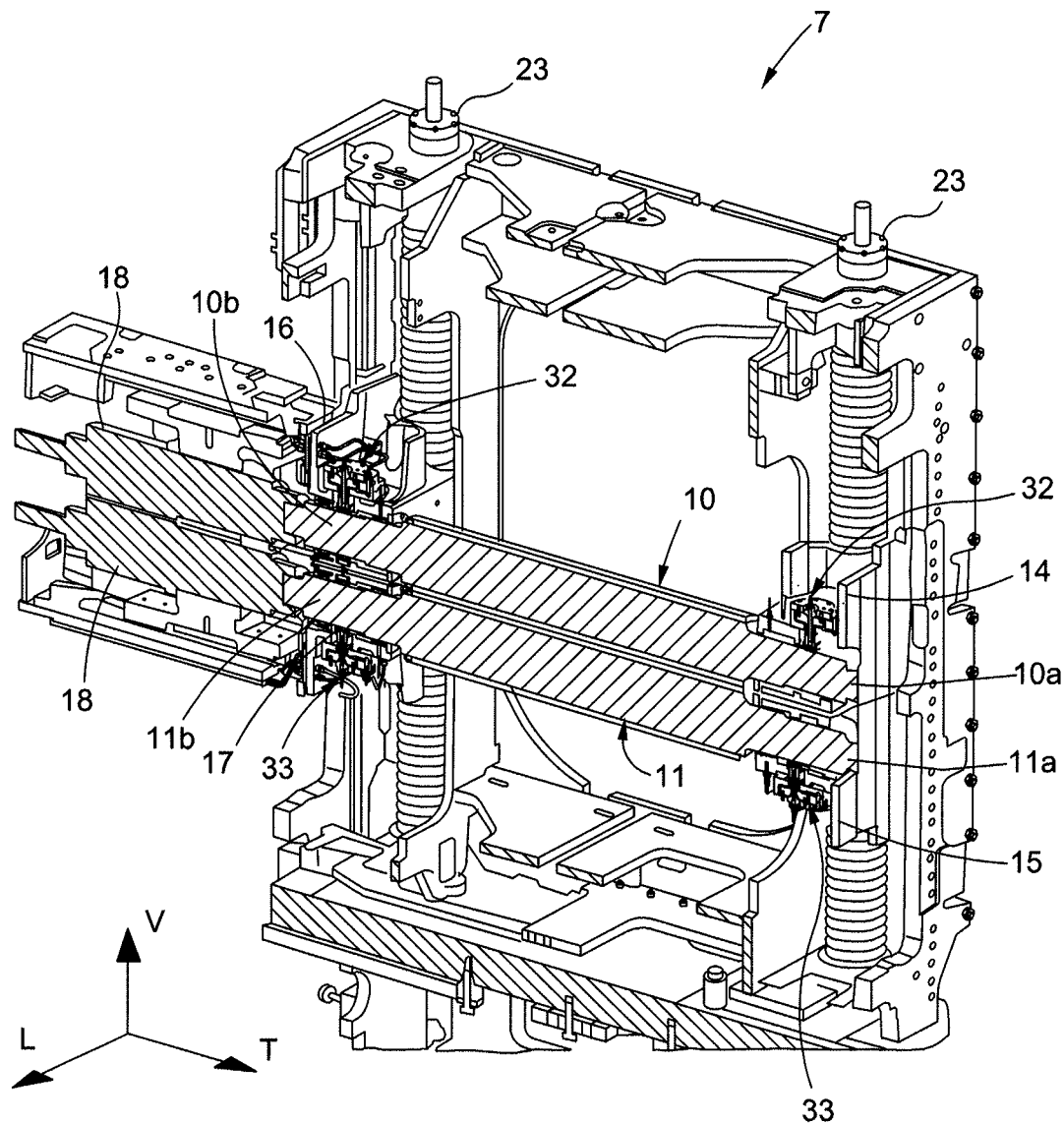
FIG. 3 shows a view in vertical section of elements of a conversion unit according to a first exemplary embodiment.
Figure 4:
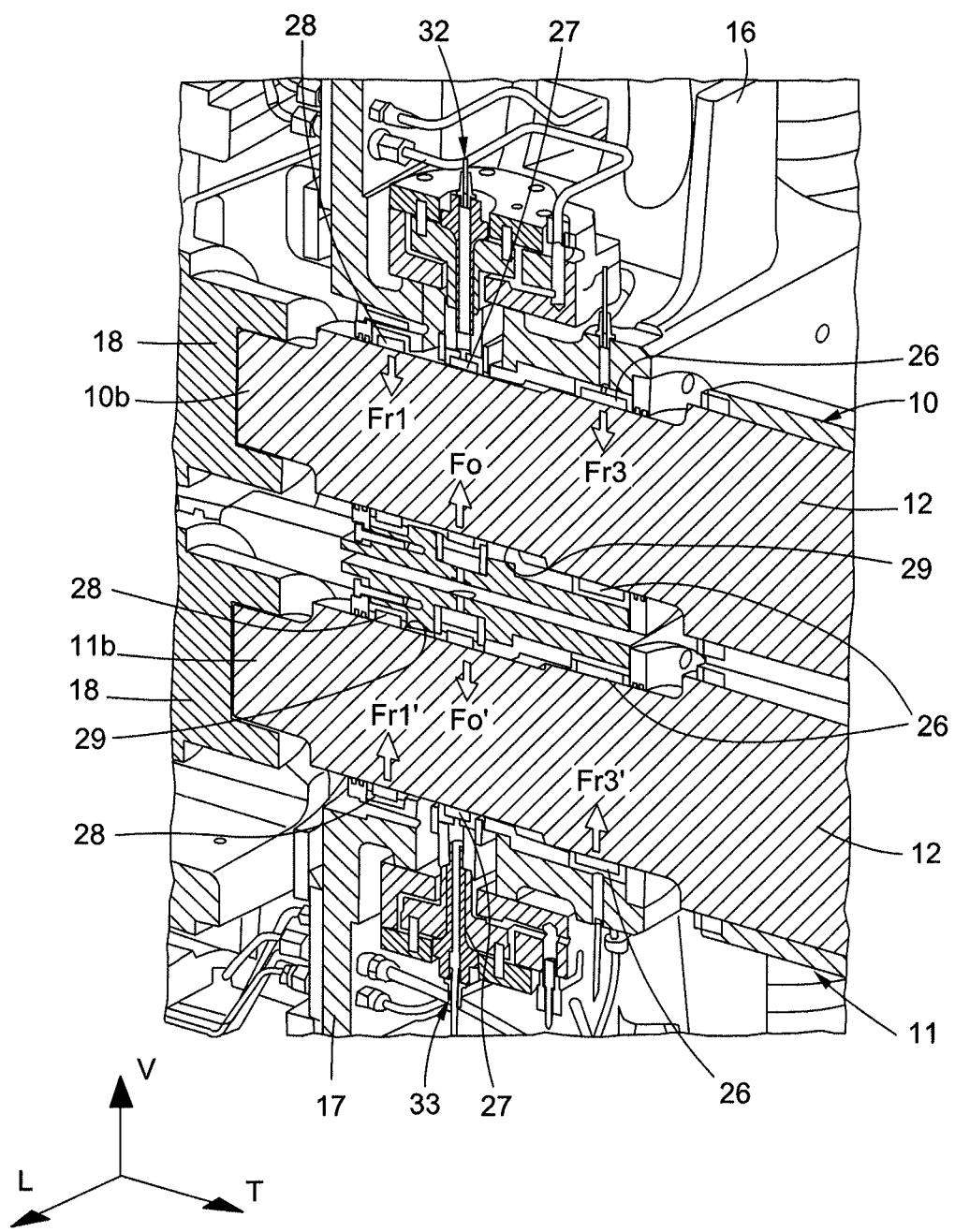
FIG. 4 is an enlarged view of the conversion unit from FIG. 3, showing bearings and ends of rotary tools.

Each bearing 14, 15, 16 and 17 comprises two end rolling bearing devices 26 and 28 and an intermediate rolling bearing device 27 interposed between the end rolling bearing devices 26, 28 (see FIG. 3). The rolling bearing devices 26, 27 and 28 are intended to engage with an end 10a, 10b, 11a, 11b of a rotary tool 10, 11. The rolling bearing devices 26, 27 and 28 are arranged coaxially in the transverse direction T, one after another.

The rolling bearing devices 26, 27 and 28 each comprise, for example, an internal surface and an external ring 30a, 30b, 30c, between which, rolling elements, such as needles 31, are positioned. Moreover, at least one internal surface of a rolling bearing device 26, 27, 28 is formed by the external surface 29 of the end 10a, 10b, 11a, 11b of the rotary tool 10, 11. For example, the external surface 29 of the ends of the rotary tools 10 and 11 forms the internal surface of all the rolling bearing devices 26, 27 and 28 (more clearly visible in FIGS. 6 to 9).

Each bearing 14, 15, 16, 17 also comprises a respective mechanical actuator 32, 33 that is configured to exert a radial preload force Fo, Fo' at the intermediate rolling bearing device 27 interposed between the end rolling bearing devices 26 and 28. The mechanical actuator 32, 33 is configured for example to exert a radial preload force Fo, Fo' on the external ring 30b of the intermediate rolling bearing device 27. More specifically, the mechanical actuator 32, 33 can be configured to move the external ring 30*b* of the intermediate rolling bearing device 27 radially. By way of example, pulling the intermediate rolling bearing device 27 with the mechanical actuator 32, 33 makes it possible to transmit the preload force to the bearing 14, 15, 16 and 17 of the conversion unit 7. The radial preload force Fo, Fo' is thus linear and has a constant direction.

The radial preload force Fo, Fo' exerted at the intermediate rolling bearing device 27 opposes the radial reaction forces of the conversion work Fr1, Fr3, Fr1', Fr3' of the end rolling bearing devices 26, 28, thereby tightening the rolling bearing devices 26, 27, 28 on the respective end 10*a*, 10*b*, 11*a*, 11*b* of the rotary tool 10, 11 such that the mounting exhibits zero or virtually zero clearance between the bearing 14, 15, 16, 17 and the end 10*a*, 10*b*, 11*a*, 11*b*. The taking up of clearances that is thus realized allows the bearings 14, 15, 16 and 17 to hold the rotary tools 10, 11 with precise relative positioning and effective holding rigidity.

According to one exemplary embodiment, the bearings 14, 16 that are intended to engage with the ends 10*a*, 10*b* of the upper rotary tool 10 are provided with a respective mechanical actuator 32 configured to move the respective intermediate rolling bearing device 27 upward. Correspondingly, the bearings 15, 17 that are intended to engage with the ends 11*a*, 11*b* of the lower rotary tool 11 are provided with a respective mechanical actuator 33 configured to move the respective intermediate rolling bearing device 27 downward. The vertical clearance between the bearings 14, 15, 16, 17 and the ends of the rotary tools 10, 11 in the direction of the forces exerted on the conversion unit is thus reduced.

Moreover, the mechanical actuator 32, 33 can comprise a control element configured to activate and deactivate the exertion of the radial preload force Fo, Fo'. In the deactivated state, when no radial preload force Fo, Fo' is exerted at the intermediate rolling bearing device 27, the rolling bearing devices 26, 27, 28 are aligned coaxially along the axis of rotation of the rotary tools 10, 11. It is thus possible to deactivate the radial preload force during maintenance phases in order to make it easier to remove and mount the rotary tools 10, 11.

The mechanical actuator can comprise any type of mechanical actuator, such as a spring or screw mechanical actuator. According to an exemplary embodiment shown in FIGS. 5 to 9, the mechanical actuators 32, 33 comprise a cylinder, such as a hydraulic cylinder. The cylinder comprises, for example, a cylindrical chamber 34 and a piston 35, a first end 35*a* of which is able to move in the chamber 34 in a radial direction with respect to the external ring 30*b* of the intermediate rolling bearing device 27, and a second end 35*b* of which is fixed to the intermediate rolling bearing device 27.

Therefore, the first end of the piston 35*a* separates the chamber 34 into first and second volumes 34*a*, 34*b* that are isolated from one another. An orifice 38 for introducing or evacuating a fluid in order to move the piston 35 is provided in the second volume 34*b*. The cylinder also comprises at least one elastic return member 37, such as a compression spring, that is interposed between the piston 35 and the first chamber 34*a* and pushes on the piston 35.

The first end 35*a* of the piston has, for example, a disk shape complementary to the cylindrical shape of the chamber 34. The second end 35*b* of the piston has, for example, a rod shape and is fixed to the external ring 30*b* in order to transmit the radial preload force to the intermediate rolling bearing device 27.

The second end 35*b* of the piston is, for example, fixed to the external ring 30*b* by means of a screw 40 of the bearing 14, 15, 16, 17, passing through the piston 35. A first end of the screw 40 is fixed in the external ring 30*b* and a second end of the screw 40 has a head that engages with the first end 35*a* of the piston in the first volume 34*a*. The external ring 30*b* has, for example, a radial protuberance allowing the first end of the screw 40 to be fixed.

Moreover, the piston 35 has, for example, a first seal 41 interposed between the first end 35*a* of the piston and the chamber 34. The first seal 41 is, for example, annular and arranged around the first end 35*a* of the piston. The piston 35 has a second seal 42 interposed between the second end 35*b* of the piston and the chamber 34. The second seal 42 is, for example, annular and arranged around the second end 35*b* of the piston. The fluid contained in the second volume 34*b* can thus be isolated in a sealed manner.

The piston 35 is thus able to move between a rest position, in which no radial preload force is exerted, and an active position, in which the piston 35 moves the external ring 30*b* of the intermediate rolling bearing device 27. The injection of a pressurized fluid into the second volume 34*b* of the chamber 34 through the orifice 38 pushes the piston 35 against the elastic return member 37, moving the external ring 30*b*. The act of injecting and evacuating the fluid therefore controls the exertion of the radial preload force Fo.

Figure 5:
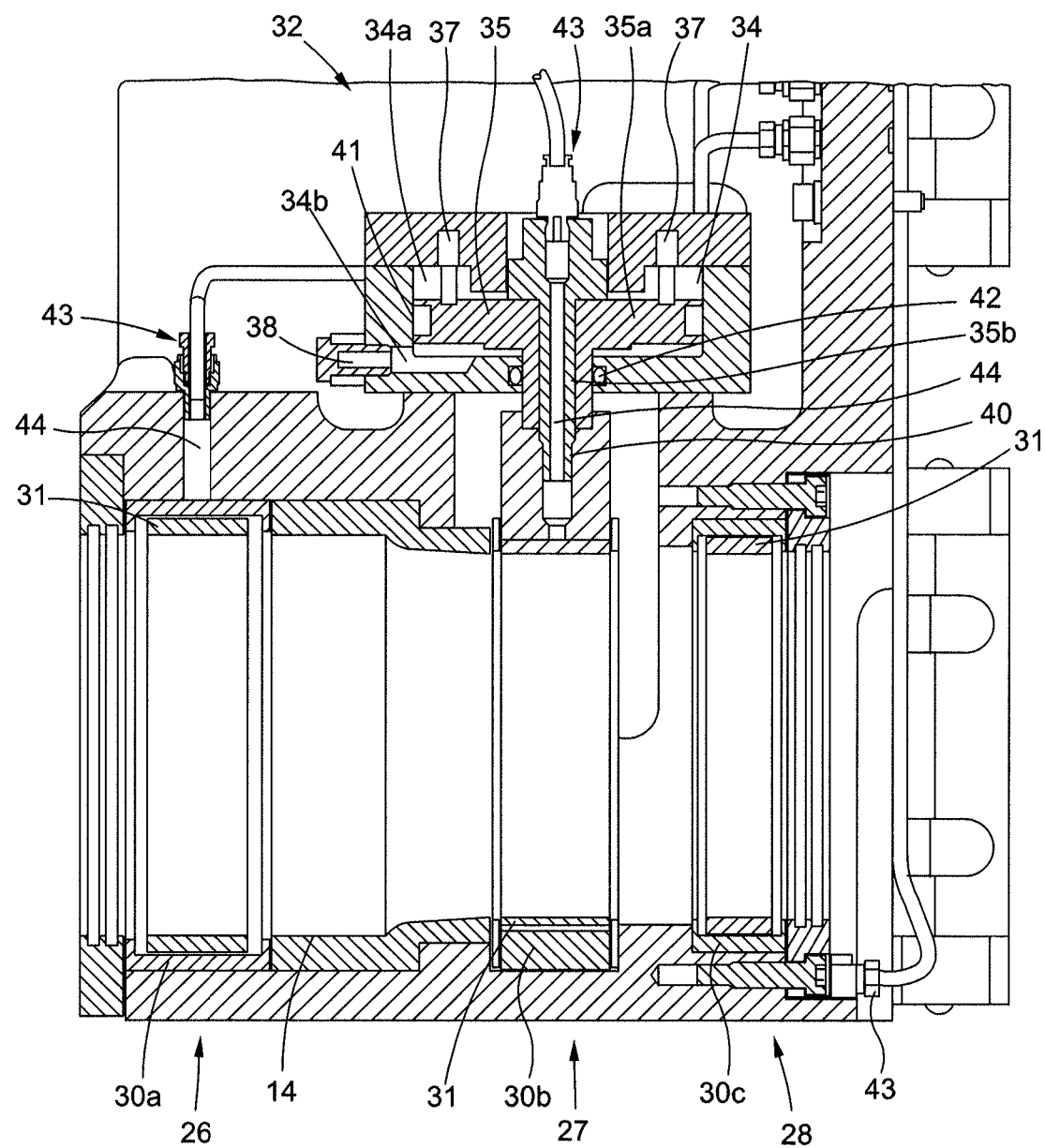
FIG. 5 shows a view in vertical section of a bearing of a conversion unit according to a second exemplary embodiment.
Figure 6:
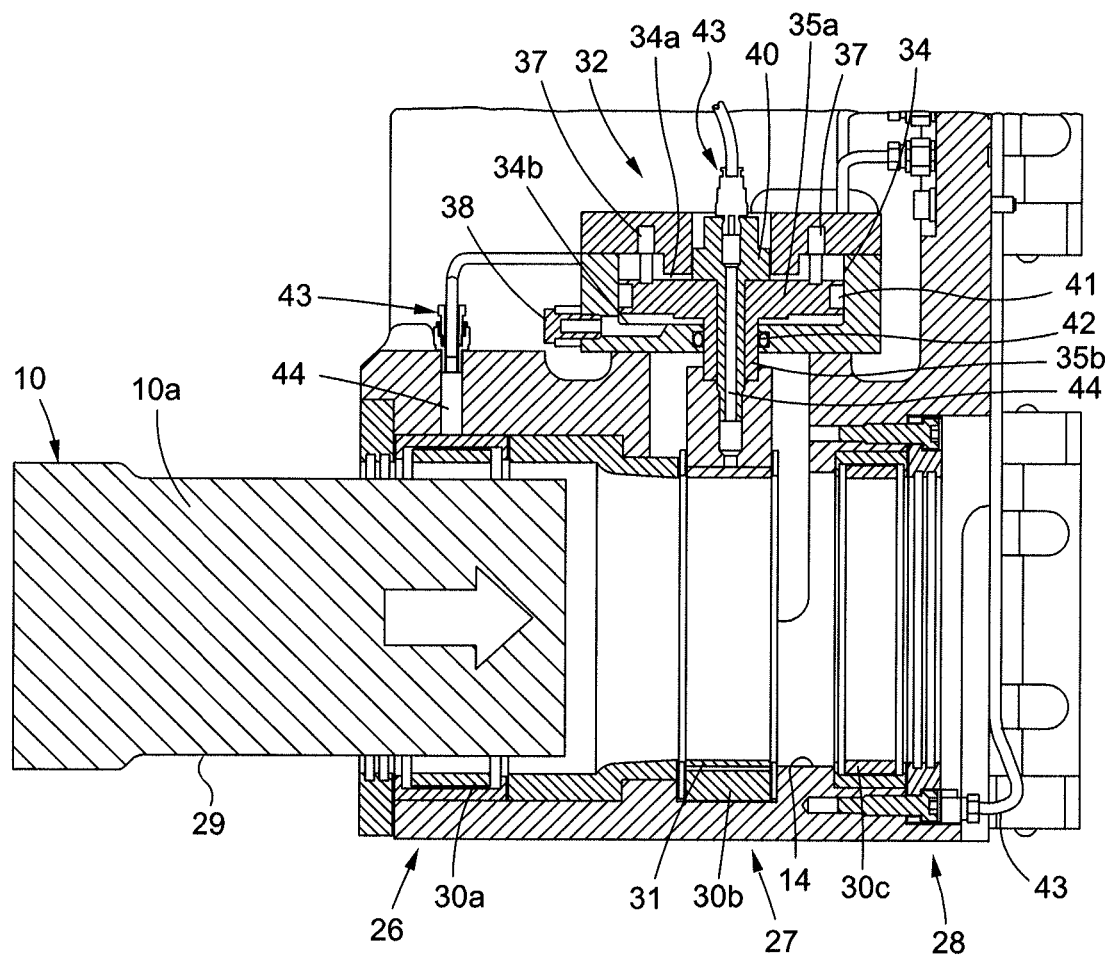
FIG. 6 shows a view similar to FIG. 5, in which a rotary tool end is fitted in an external ring of an end rolling bearing device of the bearing.
Figure 7:
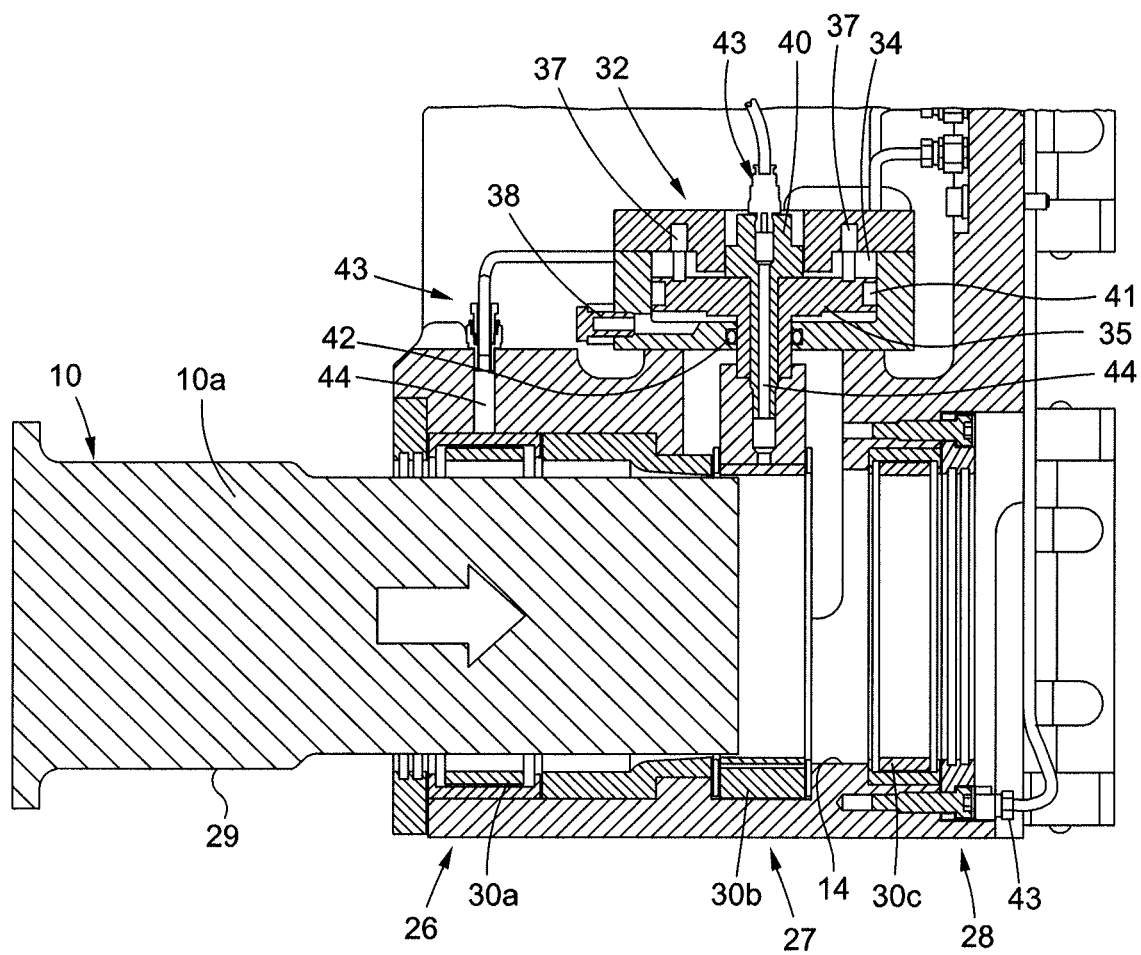
FIG. 7 shows a view similar to, and following on, from FIG. 6, in which the end of the rotary tool is fitted in the external ring of the intermediate rolling bearing device.

The bearing can also be provided with lubrication means 43 for the rolling bearing devices 26, 27, 28. The lubrication means 43 comprises, for example, a duct 44 that is provided in the bearing 14, 15, 16 and 17 and is not only connected to a lubricant supply but also connects each rolling bearing device 26, 27, 28, in order to lubricate them. For the intermediate rolling bearing device 27, the duct 44 passes, for example, through the mechanical actuator 32, 33. For example, and as can be seen in FIG. 5, the duct 44 of the lubrication means 43 passes through the screw 40 fixing the piston 35 to the external ring 30*b* and leads, for example, out of the external ring 30*b* at the rolling elements 31.

In the initial state of the conversion unit 7 (FIG. 5), the bearing is not provided with a rotary tool. The exertion of the radial preload force Fo by the mechanical actuator 32 is deactivated and the rolling bearing devices 26, 27, 28 are aligned coaxially, thereby allowing the introduction of the end 10*a* of a rotary tool 10.

Figure 8:
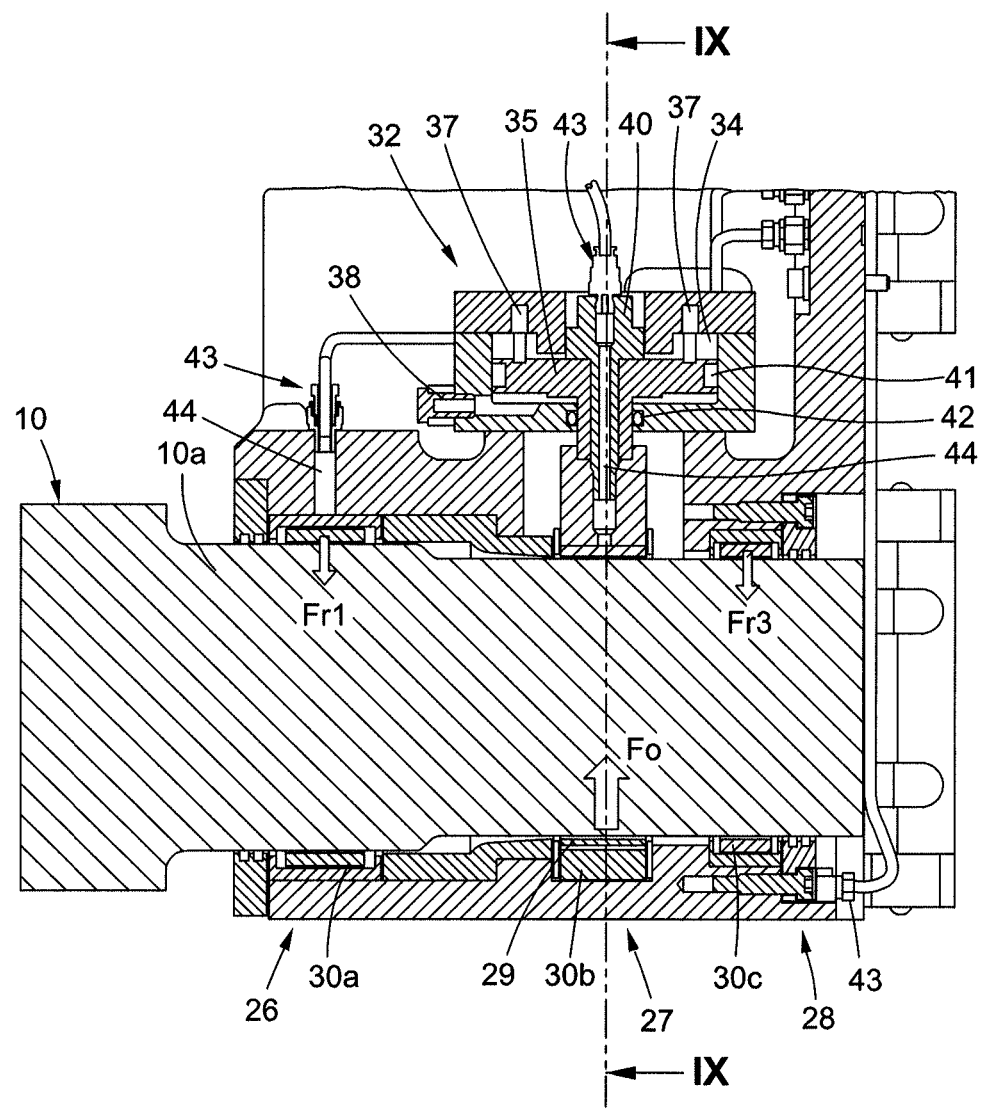
FIG. 8 shows a view similar to, and following on, from FIG. 7, in which the end of the rotary tool is fitted completely in the three external rings of the rolling bearing devices of the bearing.
Figure 9:
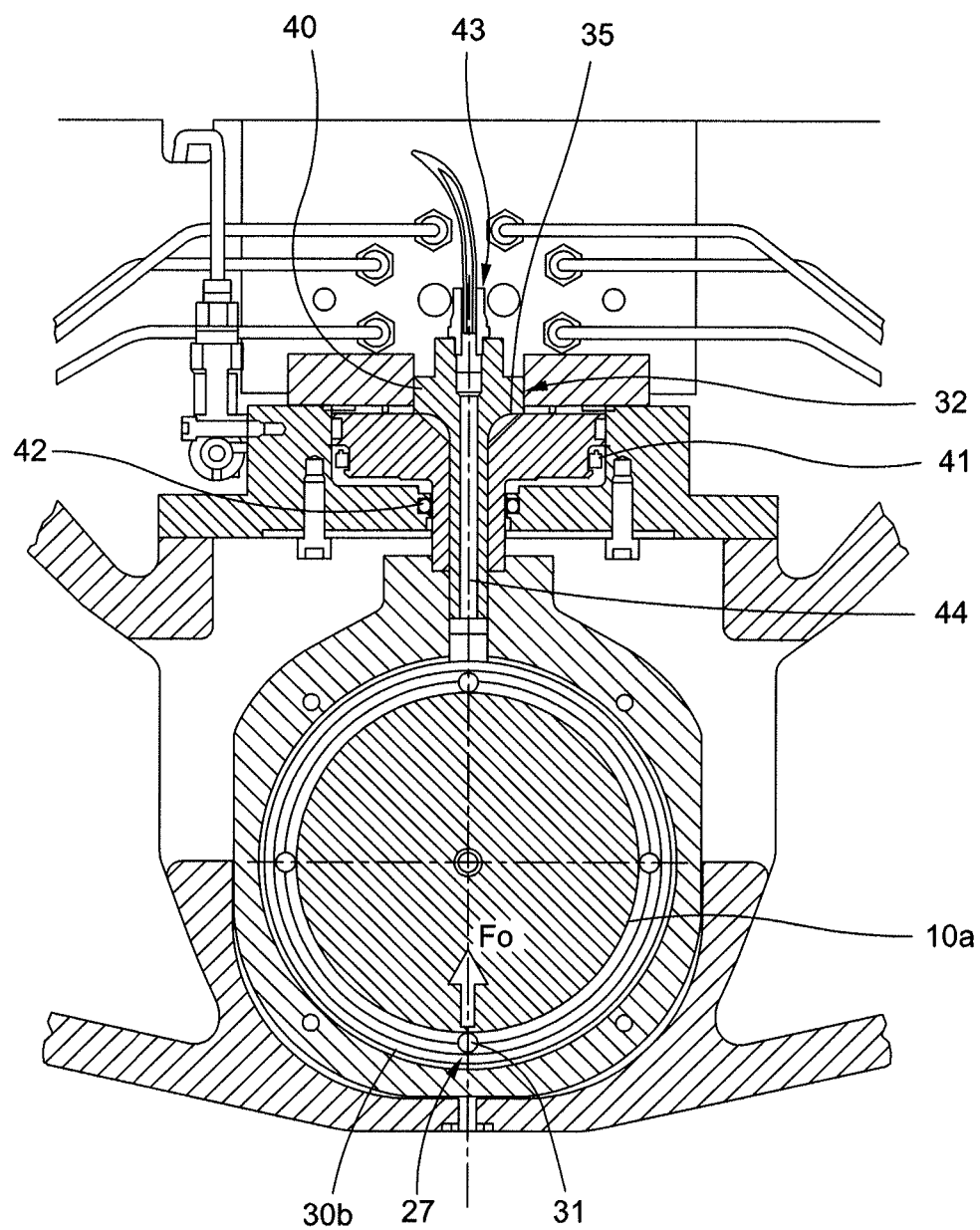
FIG. 9 shows a view in vertical section on the plane IX-IX in FIG. 8.

The end 10*a* is first of all inserted into the external ring 30*a* of the end rolling bearing device 26 (FIG. 6), then successively into the intermediate rolling bearing device 27 (FIG. 7) and finally into all of the rolling bearing devices 26, 27, 28 (FIGS. 8 and 9). Once the end 10*a* of the rotary tool 10 has been fitted completely into the front upper bearing 14, a radial preload force Fo is exerted by injecting a pressurized fluid through the orifice 38 of the second volume 34*b* of the chamber 34. The piston 35 thus rises vertically in the chamber 34, moving the external ring 30*b* of the intermediate rolling bearing device 27 upward.

The orientation of the radial preload force Fo thus exerted at the intermediate rolling bearing device 27 by the mechanical actuator 32 opposes the radial reaction forces of the conversion work Fr1, Fr3 of the end rolling bearing devices 26, 28, thereby tightening the rolling bearing devices 26, 27, 28 on the end 10*a* of the rotary tool 10 such that the mounting exhibits zero or virtually zero clearance between the front upper bearing 14 and the end 10*a*. The taking up of clearances that is thus realized allows the front upper bearing 14 to hold the rotary tool 10 with precise positioning of the rotary tool and effective holding rigidity.

For removal, the application of the radial preload force Fo is deactivated by stopping the injection of fluid before the ends of the rotary tools 10, 11 are removed from the bearings 14, 15, 16, 17. The radial preload forces Fo, Fo' can thus be deactivated during maintenance phases or change of operation phases, in order to make it easier to remove and mount the rotary tools 10, 11.

The present invention is not limited to the embodiments described and illustrated. Numerous modifications can be made without otherwise departing from the scope defined by the set of claims.

The invention claimed is:

1. A bearing assembly for a converting machine, the bearing assembly comprising a first bearing configured to hold a first rotary conversion tool, and a second bearing configured to hold a second rotary conversion tool positioned underneath and cooperating with the first rotary conversion tool to convert a substrate passing between the first and second rotary conversion tools, the first and second rotary conversion tools having parallel longitudinal axes, the first bearing comprising:
   a first end rolling bearing device engaging with an end of the first rotary conversion tool;
   a second end rolling bearing device engaging with the end of the first rotary conversion tool and spaced apart in a longitudinal axis direction from the first end rolling bearing device;
   at least one first intermediate rolling bearing device interposed between the first and second end rolling bearing devices, the at least one first intermediate rolling bearing device engaging with the end of the first rotary conversion tool; and
   at least one first mechanical actuator positioned above the first rotary conversion tool and exerting a radial preload force in a first radial direction at the first intermediate rolling bearing device;
   the second bearing comprising:
   a second intermediate bearing positioned in the longitudinal axis direction between the first and second end rolling bearing devices, the second intermediate rolling bearing device engaging with an end of the second rotary conversion tool; and
   a second mechanical actuator positioned under the second rotary conversion tool and exerting a second radial preload force in a second radial direction at the second intermediate rolling bearing device,
   wherein the first mechanical actuator provides the first radial force such that the first radial force urges the first intermediate bearing in a linear direction opposite to the second radial direction of the second radial force provided by the second mechanical actuator,
   wherein the first radial direction of the preload force is opposed to a direction of a radial reaction force on the first rotary conversion tool.

2. The bearing assembly according to claim 1, wherein the at least one first mechanical actuator is configured to exert the radial preload force on an external ring of the at least one first intermediate rolling bearing device.

3. The bearing assembly according to claim 1, wherein the at least one first mechanical actuator is configured to move an external ring of the at least one intermediate rolling bearing device radially.

4. The bearing assembly according to claim 1, wherein the at least one first mechanical actuator comprises a control element configured to activate and deactivate the application of the radial preload force.

5. The bearing assembly according to claim 1, wherein the at least one first mechanical actuator comprises a cylinder.

6. The bearing assembly according to claim 5, wherein the cylinder comprises:
   a chamber and a piston,
   the piston having a first end configured to move in the chamber in the first radial direction with respect to an external ring of the at least one intermediate rolling bearing device, and
   the piston having a second end fixed to the at least one intermediate rolling bearing device.

7. The bearing assembly according to claim 1, wherein each of the end rolling bearing devices and the at least one intermediate rolling bearing device comprises an internal surface and an external ring,
   wherein at least one internal surface of each of the end rolling bearing devices and the at least one intermediate rolling bearing device is formed by the external surface of the end of the first rotary conversion tool.

8. A conversion unit for converting a flat substrate, the conversion unit comprising the bearing assembly according to claim 1.

9. The conversion unit according to claim 8,
   wherein the at least one first mechanical actuator is configured to move upward the at least one intermediate rolling bearing device; and
   wherein the second mechanical actuator is configured to move downward the at least one intermediate rolling bearing device.

10. A method for mounting a rotary conversion tool in a bearing assembly according to claim 1, the method comprising:
    inserting ends of the first rotary conversion tool into the end rolling bearing devices of the first bearing; and then
    exerting the radial preload force at the at least one first intermediate rolling bearing device interposed between the end rolling bearing devices.

11. A method for removing a rotary conversion tool from the bearing assembly according to claim 1, the method comprising:
    deactivating application of the radial preload force at the at least one intermediate rolling bearing device interposed between the end rolling bearing devices; and
    extracting the ends of the first rotary conversion tool from the bearings.

* * * * *